(12) United States Patent
Miller

(10) Patent No.: US 8,964,555 B1
(45) Date of Patent: Feb. 24, 2015

(54) DATA NETWORK WITH CONSTRAINED SWITCH TRANSMISSION RATES

(75) Inventor: David A. Miller, Swisher, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 323 days.

(21) Appl. No.: 13/533,265

(22) Filed: Jun. 26, 2012

(51) Int. Cl.
*H04L 12/815* (2013.01)

(52) U.S. Cl.
USPC .......................................... 370/235

(58) Field of Classification Search
CPC ........ H04L 47/22; H04L 47/24; H04L 12/569
USPC .............. 370/229, 230, 230.1, 232, 233, 234, 370/235, 351, 389, 395.1, 395.2, 395.21
See application file for complete search history.

(56) References Cited

U.S. PATENT DOCUMENTS

| | | | |
|---|---|---|---|
| 7,675,919 B2 | 3/2010 | Vestal | |
| 7,787,486 B2 | 8/2010 | Vestal | |
| 7,813,277 B2 | 10/2010 | Okholm et al. | |
| 7,929,431 B2 | 4/2011 | Wilt et al. | |
| 7,983,195 B2 | 7/2011 | Andreoletti et al. | |
| 8,078,055 B1 | 12/2011 | Mazuk et al. | |
| 8,190,727 B2 | 5/2012 | Henkel | |
| 2003/0016686 A1* | 1/2003 | Wynne et al. | 370/412 |
| 2006/0293805 A1 | 12/2006 | Garcia | |
| 2007/0127521 A1* | 6/2007 | Sandell et al. | 370/466 |
| 2007/0230429 A1 | 10/2007 | Sannino | |
| 2008/0031282 A1 | 2/2008 | Vestal | |
| 2008/0043768 A1 | 2/2008 | Lopez et al. | |
| 2009/0217280 A1 | 8/2009 | Miller et al. | |
| 2009/0323704 A1* | 12/2009 | Hall et al. | 370/401 |
| 2010/0195491 A1 | 8/2010 | Gray et al. | |
| 2010/0195634 A1 | 8/2010 | Thompson | |
| 2010/0199280 A1 | 8/2010 | Vestal et al. | |
| 2011/0131377 A1 | 6/2011 | Gray et al. | |
| 2011/0292842 A1 | 12/2011 | Danet | |
| 2012/0109424 A1 | 5/2012 | Fervel et al. | |
| 2012/0183296 A1 | 7/2012 | Lopez et al. | |
| 2012/0250694 A1 | 10/2012 | Hall et al. | |
| 2013/0208630 A1 | 8/2013 | Bobrek | |

* cited by examiner

*Primary Examiner* — Obaidul Huq
(74) *Attorney, Agent, or Firm* — Angel N. Gerdzhikov; Donna P. Suchy; Daniel M. Barbieri

(57) ABSTRACT

A data network includes a plurality of end systems; a plurality of line data buses connected to the end systems; and a plurality of switches connected to the line data buses and to other switches via trunk data buses to define a star topology. The switches and end systems are configured to operate asynchronously. Each switch includes a number of packet schedulers for managing the transmission of received data flow. A number of effective line rate utilization mechanisms are each associated with a respective packet scheduler for providing the service rate of that packet scheduler. Switch egress ports transmit the received data flow. Each switch egress port has a defined configured effective transmission rate. Each effective line rate utilization mechanism reduces the utilization rate to the defined configured effective transmission rate.

17 Claims, 4 Drawing Sheets

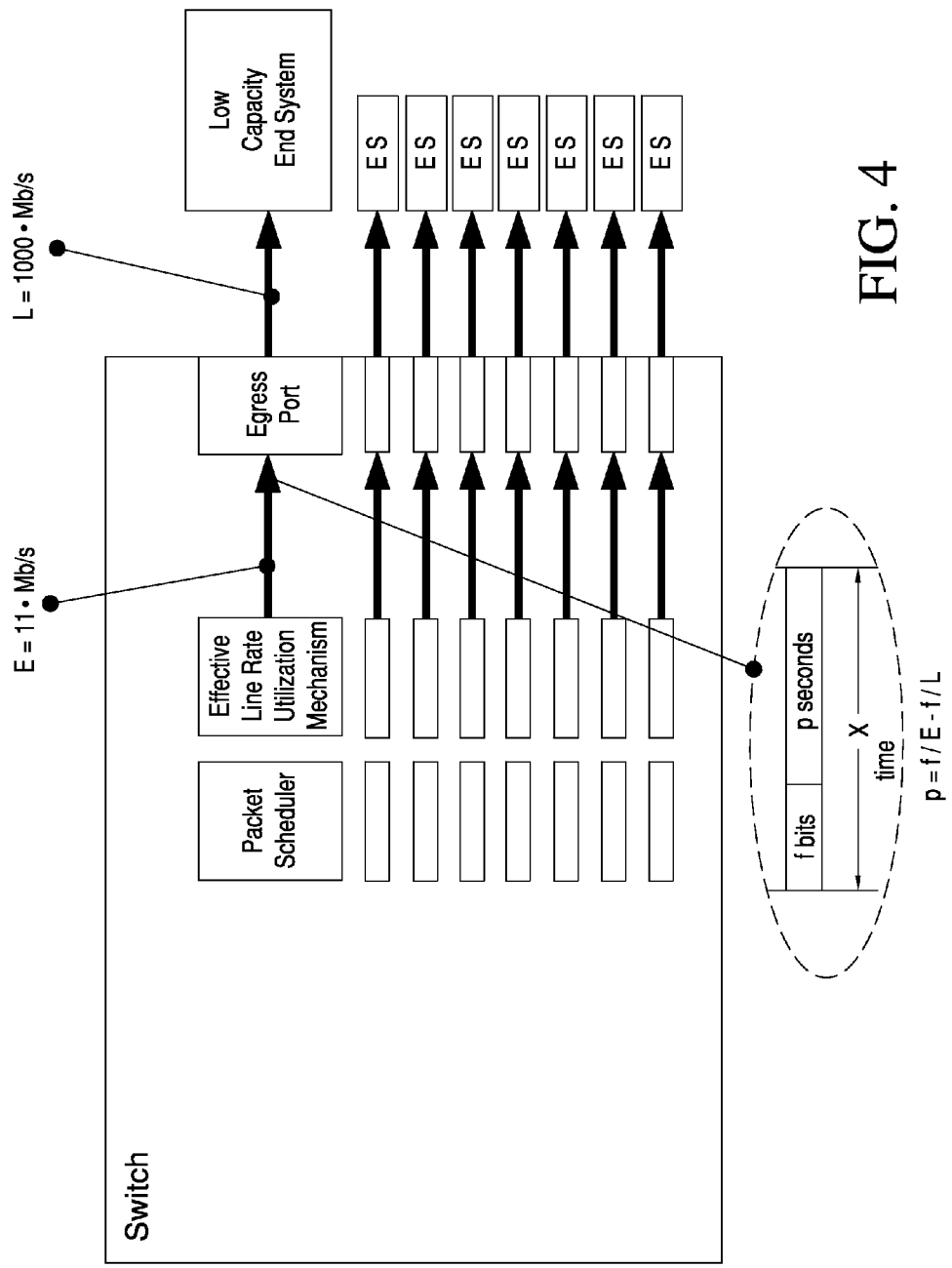

DATA NETWORK WITH CONSTRAINED SWITCH TRANSMISSION RATES

BACKGROUND OF THE INVENTION

1. Field of the Invention

The present invention relates generally to avionics systems and more particularly to improved switching systems for Avionics Full-Duplex Switched Ethernet (AFDX) systems.

2. Description of the Related Art

Modern onboard avionics networks serve to provide data transfer between various components of an aircraft. Avionics systems typically have a variety of systems that provide data to processing components of the aircraft or exchange data among one or more components of the aircraft. For example, a variety of avionics modules may gather avionics data (e.g., sensors detecting speed, direction, external temperature, control surface positions, and the like) that is routed by the avionics system via an avionics network to one or more aircraft components such as displays, monitoring circuits, processors, and the like. The speed of the physical media used to interconnect components is faster than the components' ability to receive the data. This serves as a barrier to entry of end systems.

In some aircraft systems, the avionics network may be constructed with an Aeronautical Radio Inc. (ARINC) 429 data bus capable of supporting communication between many components. More recently, Ethernet networks have been used in avionic network environments by leveraging Commercial Off-The-Shelf (COTS) technology to increase bandwidth and reduce cost.

Ethernet type networks have been used in communication networks for implementing communication among various network components. An Ethernet network may be used to send or route data in a digital form by packets or frames. Each packet contains a set of data, and the packet is generally not interpreted while sent through the Ethernet network. In an avionics network environment, the Ethernet network typically has different components that subscribe to the avionics network and connect to each other through switches. Each network subscriber can send packets in digital form, at controlled rates, to one or more other subscribers. When a switch receives the packets, the switch determines the destination equipment and directs or switches the packets to such equipment.

Such Ethernet networks may include ARINC-664 based networks. In a switched full-duplex Ethernet type network, the term "full-duplex" refers to sending and receiving packets at the same time on the same link, and the term "switched" refers to the packets being switched in switches on appropriate outputs. However, the ARINC-664 network uses multiple switches and redundant paths to route data, point-to-point or point-to-multipoint across the switches.

Avionics Full-Duplex Switched Ethernet (AFDX) is a data network for safety-critical applications that utilizes dedicated bandwidth while providing deterministic Quality of Service (QoS). AFDX is based on IEEE 802.3 Ethernet technology and utilizes Commercial Off-The-Shelf (COTS) components. AFDX is a specific implementation of ARINC Specification 664 Part 7, a profiled version of an IEEE 802.3 network per parts 1 & 2, which defines how Commercial Off-the-Shelf (COTS) networking components will be used for future generation Aircraft Data Networks (ADN). The six primary aspects of AFDX include full duplex, redundancy, deterministic, high speed performance, switched and profiled network.

Certain AFDX data networks require synchronous scheduling for proper operation. For example, U.S. Pat. No. 7,675,919, issued to S. C. Vestal, entitled, "End System Scheduling for Switched Networks," discloses a method for scheduling one or more data packet transfers over a computer-based distributed network. The method involves constructing a cyclic schedule from a plurality of data packets, wherein the cyclic schedule is constructed to ensure that each data packet transfer is substantially free of jitter. The method further involves synchronizing the cyclic schedule with at least one periodic processing schedule and transmitting the synchronized data packets as arranged by the cyclic schedule.

U.S. Pat. No. 7,787,486, issued to S. C. Vestal, entitled, "Method and System for Achieving Low Jitter in Real-Time Switched Networks," discloses a method and system for increasing the precision of time synchronization among a plurality of host nodes in a packet-switched network by reducing transmission delay variation in the network. Each host node is provided with a distinct set of transmission times selected from a global schedule in such a way as to avoid concurrent transmission of messages by the plurality of host nodes. The transmission times may be determined as offsets within a global hyperperiod, and each host node carries out transmissions according to predetermined offsets of the respective host node. Transmissions according to offsets may be applied to real-time messages, including time-synchronization messages, hence yielding increased precision of synchronization.

Some networks are designed for asynchronous operation between components. This provides cost savings. With such networks each end system is viewed as having a set of flows where each flow has an expected arrival envelope. It is desired that the number of virtual links (VLs) be maximized for a given level of performance.

Software based end systems may not support the line rate transmission rates from AFDX switches. This is true at 100 Mbps but will be more of a problem when 1 Gbps and 10 Gbps physical line rate capabilities are utilized. Even when software based end systems can support the line rate capability, this usually comes at a significant cost of reserved processor capacity needed to manage bursts of arriving data.

As will be disclosed below the present invention addresses issues faced when low capacity end systems are utilized in the network. As used herein the term "low capacity" end systems means systems that cannot process received frames as fast as they arrive.

U.S. Ser. No. 13/533,034, now issued as U.S. Pat. No. 8,817,622, entitled, "DATA NETWORK WITH AGGREGATE FLOW MONITORING," filed concurrently herewith, by the applicants, D. A. Miller and D. E. Mazuk, and assigned to the present assignee, discusses the use of aggregate flow monitoring in a data network for monitoring the aggregate arrival data flow in defined traffic constraint envelopes containing frames. This co-filed patent application is incorporated by reference herein in its entirety.

U.S. Ser. No. 13/533,572, entitled, "DATA NETWORK WITH 'PER FLOW' FLOW MONITORING," filed concurrently herewith, by the applicants, D. A. Miller and D. E. Mazuk, and assigned to the present assignee, discusses the use of "per flow" monitoring in a data network. This co-filed patent application is incorporated by reference herein in its entirety.

SUMMARY OF THE INVENTION

In a broad aspect, the present invention is embodied as a data network, including a plurality of end systems; a plurality of line data buses connected to the end systems; and a plurality of switches connected to the line data buses and to other switches via trunk data buses to define a star topology. The switches and end systems are configured to operate asynchronously. Each switch includes a plurality of packet schedulers for managing the transmission of received data flow. A plurality of effective line rate utilization mechanisms are each associated with a respective packet scheduler for providing the service rate of that packet scheduler. A plurality of switch egress ports transmit the received data flow. Each switch egress port has a defined configured effective transmission rate. Each effective line rate utilization mechanism reduces the utilization rate to the defined configured effective transmission rate.

These inventive concepts are particularly useful as implemented in an avionics data network, and more particularly for an Avionics Full-Duplex Switched Ethernet (AFDX) network. Each effective line rate utilization mechanism reduces the utilization rate to the defined configured effective transmission rate by introducing a silent period following each frame transmission so that the duration of the transmission time of the frame plus the silent period is equal to the duration of time needed to transmit the frame at the effective line rate. Each packet scheduler includes a means for storing frames pending transmission, a policy to choose among pending frames when the egress port becomes idle, and a service rate.

In another broad aspect, the present invention may be embodied as a method for routing data flow in a data network of a type having a plurality of end systems, a plurality of line data buses connected to the end systems, and a plurality of switches connected to the line data buses and to other switches via trunk data buses to define a star topology, the switches and end systems configured to operate asynchronously. Each switch is configured to operate by the steps of: a) managing the transmission of received data flow, via a plurality of packet schedulers; b) providing the service rate of each packet scheduler, utilizing a plurality of effective line rate utilization mechanisms, each associated with a respective packet scheduler; and; c) transmitting the received data flow utilizing a plurality of switch egress ports, each switch egress port having a defined configured effective transmission rate. Each effective line rate utilization mechanism reduces the utilization rate to said defined configured effective transmission rate.

The present invention is particularly advantageous in avionics applications because it expands the scope of devices that can be connected in the backbone network. It reduces the cost of connected devices.

This could be applicable to future AFDX switch based design approaches. Unlike U.S. Pat. No. 7,675,919, which relates to an end system transmission schedule and U.S. Pat. No. 7,787,486, which relates to establishing coordinated end system transmission schedules for achieving low jitter, the present invention relates to an asynchronous system. This simplifies and reduces the overall cost of the overall system.

Other objects, advantages, and novel features will become apparent from the following detailed description of the invention when considered in conjunction with the accompanying drawings.

BRIEF DESCRIPTION OF THE DRAWINGS

FIG. 4 is a diagram illustrating the derivation of the quiet period.

The same elements or parts throughout the figures of the drawings are designated by the same reference characters, while equivalent elements bear a prime designation.

DETAILED DESCRIPTION OF THE INVENTION

Figure 1:
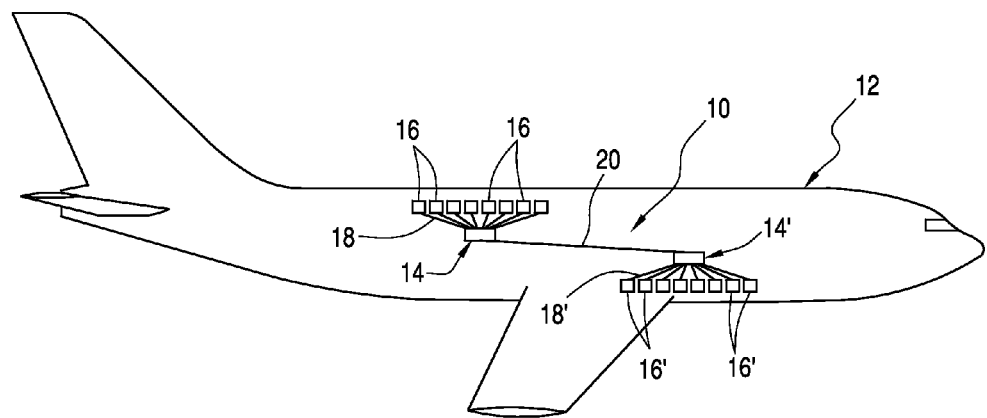
FIG. 1 illustrates an aircraft employing a data network of the present invention.

Referring now to the drawings and the characters of reference marked thereon, FIG. 1 illustrates the data network of the present invention, designated generally as 10, implemented as an avionics data network, more specifically as an AFDX Ethernet network in an aircraft 12. This illustration is greatly simplified and shows only two switches 14, 14' and eight avionics end systems 16, 16' connected to each switch 14, 14'. Actual data networks 10 in an aircraft may support tens and even hundreds of switches 14, 14' and hundreds of end systems 16, 16'. Some of the connected end systems have relatively low receive rate capacities, as indicated by numeral designations 16'. These end systems 16' are usually implemented in software and may not be able to process data at the full line rate. This is especially true when, for example, 100 Mbps and 1000 Mbps line rate capacity links are used. This star topology minimizes wire weight as each end system 16, 16' is connected to a nearby switch 14. Line data buses 18, 18' connect the end systems 16, 16' to the switches 14, 14'. Switches 14, 14' are linked by other switches via trunk data buses 20. As used herein the term "star topology" is defined broadly to refer to a data network in which for at least one switch some portion of data received to multiple ingress ports are transmitted to a common egress port.

Typical end systems 16, 16' may be, for example, sensors, effectors, display systems, computation platforms, radios, data concentrators, audio components, engine controllers, flight control computers, etc.

Figure 2:
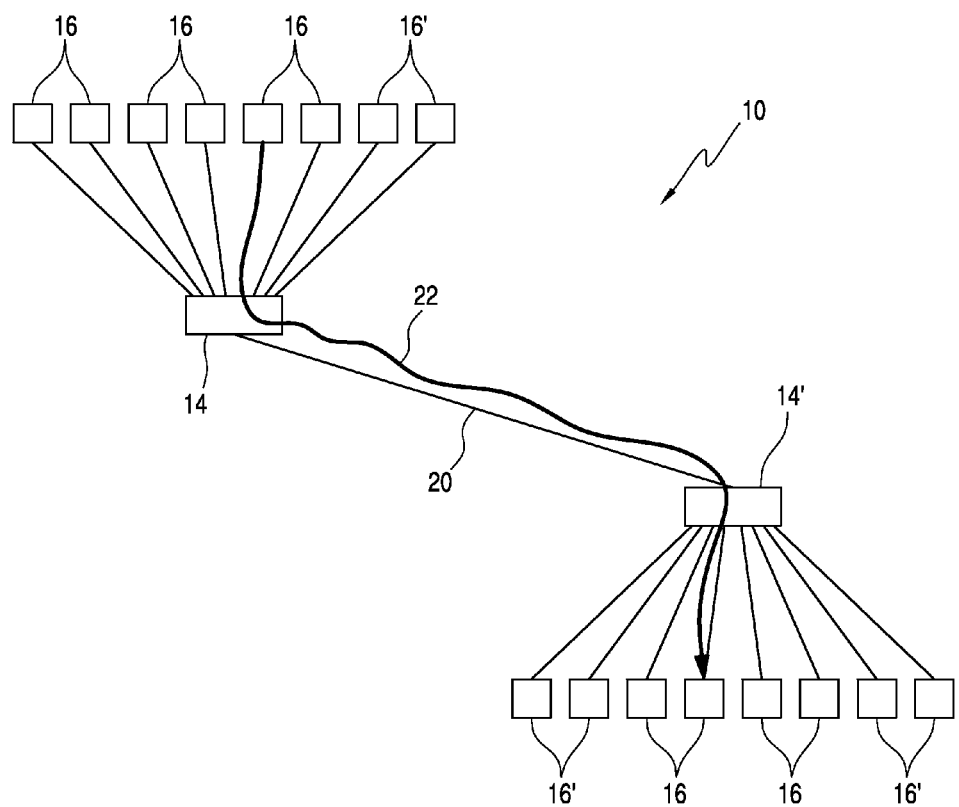
FIG. 2 illustrates the data network of FIG. 1 showing traffic flow supported under the AFDX Ethernet using Virtual Links (VLs).

As can be seen by reference to FIG. 2, flow traffic is supported under AFDX Ethernet using Virtual Links (VLs) 22. Each VLs 22 is routed from a source end system 16 to one or more destination end systems 16'. Each VLs is provisioned with allocated bandwidth and is characterized with a bounding delay bound from source end system 16 to each destination end system 16'. Contention with other VLs 22 causes delay in the network as a frame may have to wait at each switch egress (output port) for transmission. The switches and end systems are configured to operate asynchronously in their emission behaviors. There is no effort needed to coordinate clock timing.

Figure 3:
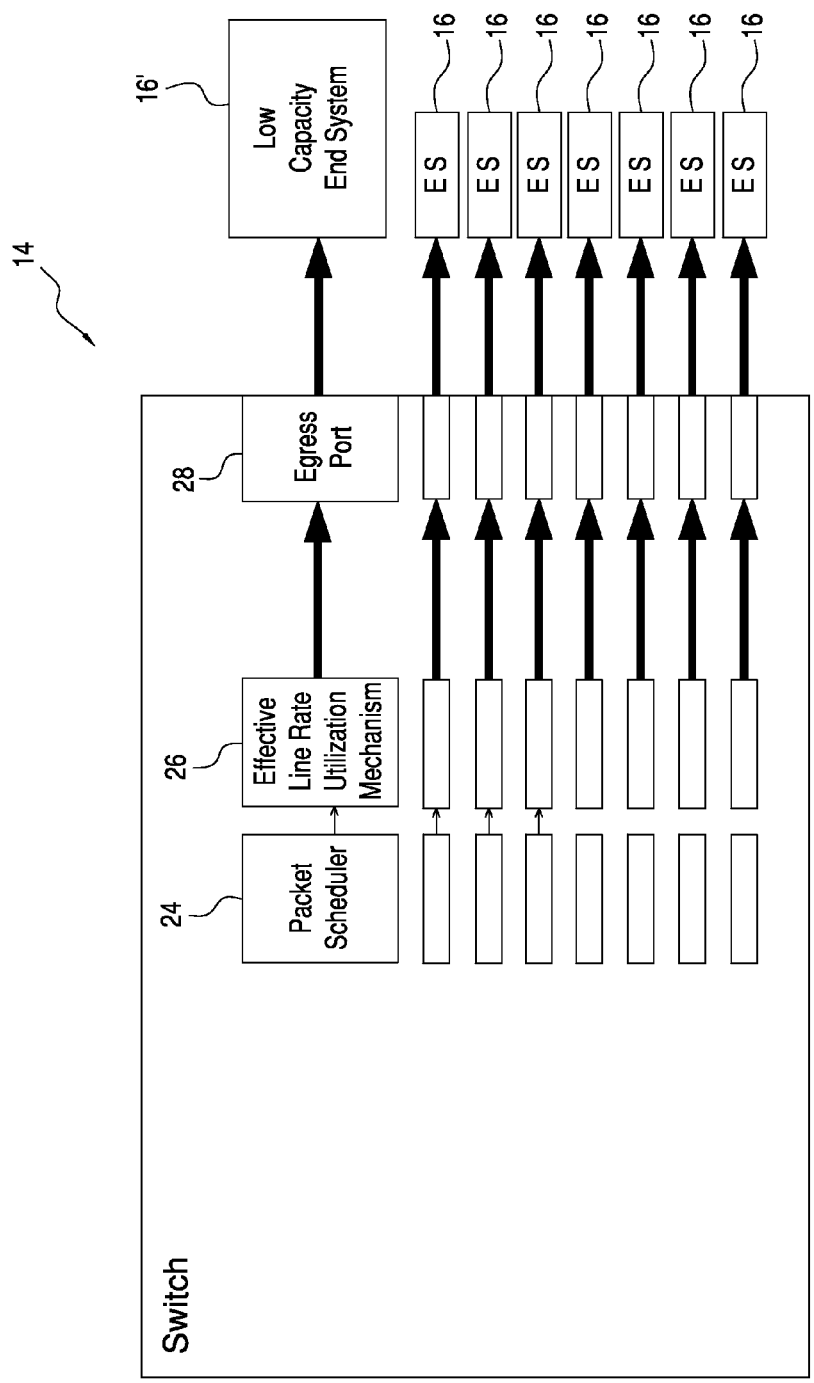
FIG. 3 is a schematic illustration of a switch of the data network of the present invention connected to a low capacity end system and a number of higher capacity end systems.

Referring now to FIG. 3, an enlarged schematic illustration of a switch 14 is shown. Each switch includes a plurality of packet schedulers 24 for managing the transmission of received data flow. A plurality of effective line rate utilization mechanisms 26 are each associated with a respective packet scheduler 24 for providing the service rate of that packet scheduler 24. A plurality of switch egress ports 28 transmit the received data flow. Each switch egress port has a defined configured effective transmission rate. Each effective line rate utilization mechanism 26 reduces the utilization rate to the defined configured effective transmission rate.

Each packet scheduler 24 includes a means for storing frames pending transmission, a policy to choose among pending frames when the egress (output) port 28 becomes idle, and a service rate. Examples of policies include first in first out (FIFO) and earliest deadline first (EDF). The service rate is typically derived from the transmission bit rate of the egress port.

Each effective line rate utilization mechanism 26 reduces the utilization rate to the defined configured effective transmission rate by introducing a silent period following each frame transmission so that the duration of the transmission time of the frame plus the silent period is equal to the duration of time needed to transmit the frame at the effective line rate. The effective line rate utilization mechanism provides the service rate of the packet scheduler. For example, the service rate might be 11 Mbps. The effective line service rate must be greater than the allocated bandwidth on the link to the low capacity end system. The effective service rate must be no more than the line capacity rate of the link. This allows the receiving low capacity end system to manage the reception of data from the switch. This allows a low capacity end system 16' to be connected to a high capacity physical line without having to functionally implement the reception processing capacity that would otherwise be needed.

The line data buses are capable of being of differing types. For example, they could be of differing speed of Ethernet, ARINC-429 lines, or MIL-STD-1553 lines.

The delay and delay-jitter bound requirements, frame loss probability requirements, and bandwidth provisioning requirements have been validated by an analysis tool. The analysis tool may be, for example, an off-line algorithm that runs on a PC tool for computing bandwidth sufficiency, delay and delay-jitter bounds, and needed buffering, using the effective line rate.

A "flow" is defined herein broadly to refer to a set of frames passing an observation point in the network during a certain time interval, all frames belonging to a particular flow having a set of common properties. The common properties are unique to the bus used to support the arriving frames. For example, when AFDX is used, all frames having a common virtual link ID are considered part of the same flow. For example, when a TDMA bus is used, all frames arriving on a common allocated time slot may be considered part of the same flow.

The switch 14 is preferably embodied as an application specific integrated circuit (ASIC). However, as will be discussed below in more detail hereinafter it may be embodied in other manners known to those skilled in this field.

Referring now to FIG. 4, the diagram shows that the effective line rate utilization mechanism reduces the utilization rate of the physical medium link to a configured rate (i.e. effective line rate or effective transmission rate) E Mbps, where the physical line rate capacity of the link is L Mbps. For example, the physical line rate capacity may be 1000 Mbps and the effective line rate capacity may be set to 11 Mbps. The effective line rate utilization mechanism 26 introduces a silent period between each frame transmission on the physical link so that the effective utilized rate (effective line rate capacity) is E. The duration of p (silent period) for a frame of size f is f/E−f/L. (This silent period is in addition to the inter-frame gap typically in an Ethernet system.)

The effective line time, X, is the time required to transmit the frame at the effective line rate E. Therefore, the silent period p may be derived as follows, with reference to FIG. 4:

$$p = X - f/L$$

$$X = p + f/L$$

$$E = f/X = f/(p + f/L)$$

$$p = f/L = f/E$$

$$p = f/E - f/L$$

The equation derived above is a preferred method for determining the silent period however it is understood that other methods may be used. For example, the denomination of units may be in bytes or frames. Furthermore, a burst can be accommodated by implementing a token bucket as a service curve.

The above concepts may be implemented in store and forward switches and/or cut through switches.

Although the inventive concepts herein have been described with respect to avionics applications they may be implemented in a variety of applications where safety motivations require detailed scrutiny beyond customer satisfaction. These include, for example, automotive applications, robotic applications, and medical applications.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Other embodiments and configurations may be devised without departing from the spirit of the invention and the scope of the appended claims.

The invention claimed is:

1. A data network, comprising:
a) a plurality of end systems;
b) a plurality of line data buses connected to said plurality of end systems;
c) a plurality of switches connected to said plurality of line data buses and to other switches via trunk data buses to define a star topology, said switches and end systems configured to operate asynchronously, each switch comprising:
  i. a plurality of packet schedulers for managing a transmission of received data flow;
  ii. a plurality of effective line rate utilization mechanisms, each associated with a respective packet scheduler for providing the service rate of that packet scheduler; and,
  iii. a plurality of switch egress ports for transmitting the received data flow, each switch egress port having a defined configured effective transmission rate,
wherein each effective line rate utilization mechanism reduces a utilization rate to said defined configured effective transmission rate by introducing a silent period following each frame transmission of a packet so that a duration of a transmission time of a frame plus the silent period is equal to a duration of time needed to transmit the frame at an effective line rate.

2. The data network of claim 1, wherein said plurality of switches are connected to said plurality of line data buses and to other switches via trunk data buses to define an avionics data network.

3. The data network of claim 1, wherein said plurality of switches are connected to said plurality of line data buses and to other switches via trunk data buses to define an Avionics Full-Duplex Switched Ethernet (AFDX).

4. The data network of claim 1, wherein each packet scheduler includes a means for storing frames pending transmission, a policy to choose among pending frames when an egress port becomes idle, and a service rate.

5. The data network of claim 4, wherein said effective line rate utilization mechanism provides the service rate of said packet scheduler.

6. The data network of claim 1, wherein said plurality of line data buses are capable of being of differing types.

7. The data network of claim 1, wherein an effective transmission rate is measured in bytes, frames, and/or bytes in combination with frames.

8. A switch for a data network of a type having a plurality of end systems, a plurality of line data buses connected to the plurality of end systems, and a plurality of switches connected to said plurality of line data buses and to other switches via trunk data buses to define a star topology, the plurality of switches and plurality of end systems configured to operate asynchronously, each switch of said plurality of switches comprising:
a) a plurality of packet schedulers for managing a transmission of received data flow;
b) a plurality of effective line rate utilization mechanisms, each associated with a respective packet scheduler for providing the service rate of that packet scheduler; and,
c) a plurality of switch egress ports for transmitting the received data flow, each switch egress port having a defined configured effective transmission rate,
wherein each effective line rate utilization mechanism reduces a utilization rate to said defined configured effective transmission rate by introducing a silent period following each frame transmission of a packet so that a duration of a transmission time of a frame plus the silent period is equal to a duration of time needed to transmit the frame at an effective line rate.

9. The switch of claim 8, wherein said data network defines an avionics data network.

10. The switch of claim 8, wherein said data network defines an Avionics Full-Duplex Switched Ethernet (AFDX).

11. The switch of claim 8, wherein each packet scheduler includes a means for storing frames pending transmission, a policy to choose among pending frames when an egress port becomes idle, and a service rate.

12. A method for routing data flow in a data network of a type having a plurality of end systems, a plurality of line data buses connected to the plurality of end systems, and a plurality of switches connected to said plurality of line data buses and to other switches via trunk data buses to define a star topology, the plurality of switches and plurality of end systems configured to operate asynchronously, comprising utilizing said plurality of switches which are each configured to operate by the steps of:
a) managing a transmission of received data flow, via a plurality of packet schedulers;
b) providing the service rate of each packet scheduler, utilizing a plurality of effective line rate utilization mechanisms, each associated with a respective packet scheduler; and,
c) transmitting the received data flow utilizing a plurality of switch egress ports, each switch egress port having a defined configured effective transmission rate,
wherein each effective line rate utilization mechanism reduces a utilization rate to said defined configured effective transmission rate by introducing a silent period following each frame transmission of a packet so that a duration of a transmission time of a frame plus the silent period is equal to a duration of time needed to transmit the frame at an effective line rate.

13. The method of claim 12, wherein said plurality of switches are connected to said plurality of line data buses and to other switches via trunk data buses to define an avionics data network.

14. The method of claim 12, wherein said plurality of switches are connected to said plurality of line data buses and to other switches via trunk data buses to define an avionics data network comprising an Avionics Full-Duplex Switched Ethernet (AFDX).

15. The method of claim 12, wherein each packet scheduler includes a means for storing frames pending transmission, a policy to choose among pending frames when an egress port becomes idle, and a service rate.

16. A data network, comprising:
a) a plurality of end systems;
b) a plurality of line data buses connected to said plurality of end systems;
c) a plurality of switches connected to said plurality of line data buses and to other switches via trunk data buses to define a star topology, said switches and end systems configured to operate asynchronously, each switch comprising:
   i. a plurality of packet schedulers for managing a transmission of received data flow;
   ii. a plurality of effective line rate utilization mechanisms, each associated with a respective packet scheduler for providing the service rate of that packet scheduler; and,
   iii. a plurality of switch egress ports for transmitting the received data flow, each switch egress port having a defined configured effective transmission rate,
wherein each effective line rate utilization mechanism reduces a utilization rate to said defined configured effective transmission rate by introducing a silent period (p) for a frame of size f, where $p=f/E-f/L$, where E is an effective utilized rate and L is a physical line rate capacity of a link following each frame transmission of a packet so that a duration of a transmission time of a frame plus the silent period is equal to a duration of time needed to transmit the frame at an effective line rate.

17. A switch for a data network of a type having a plurality of end systems, a plurality of line data buses connected to the plurality of end systems, and a plurality of switches connected to said plurality of line data buses and to other switches via trunk data buses to define a star topology, the plurality of switches and plurality of end systems configured to operate asynchronously, each switch of said plurality of switches comprising:
a) a plurality of packet schedulers for managing a transmission of received data flow;
b) a plurality of effective line rate utilization mechanisms, each associated with a respective packet scheduler for providing the service rate of that packet scheduler; and,
c) a plurality of switch egress ports for transmitting the received data flow, each switch egress port having a defined configured effective transmission rate,
wherein each effective line rate utilization mechanism reduces a utilization rate to said defined configured effective transmission rate by introducing a silent period (p) for a frame of size f, where $p=f/E-f/L$, where E is an effective utilized rate and L is a physical line rate capacity of a link following each frame transmission of a packet so that a duration of a transmission time of a frame plus the silent period is equal to a duration of time needed to transmit the frame at an effective line rate.

\* \* \* \* \*